United States Patent
Marasco et al.

(10) Patent No.: US 9,719,427 B2
(45) Date of Patent: Aug. 1, 2017

(54) TURBINE BLADE PLATFORM SEAL ASSEMBLY VALIDATION

(71) Applicant: SOLAR TURBINES INCORPORATED, San Diego, CA (US)

(72) Inventors: Angelo Vincent Marasco, San Diego, CA (US); Olivier Jacques Louis Lamicq, San Diego, CA (US)

(73) Assignee: Solar Turbines Incorporated, San Diego, CA (US)

(*) Notice: Subject to any disclaimer, the term of this patent is extended or adjusted under 35 U.S.C. 154(b) by 790 days.

(21) Appl. No.: 14/159,830

(22) Filed: Jan. 21, 2014

(65) Prior Publication Data

US 2015/0204245 A1    Jul. 23, 2015

(51) Int. Cl.
| | | |
|---|---|---|
| F01D 5/30 | (2006.01) | |
| F02C 7/28 | (2006.01) | |
| F01D 11/00 | (2006.01) | |

(52) U.S. Cl.
CPC .............. *F02C 7/28* (2013.01); *F01D 11/006* (2013.01); *F05D 2260/80* (2013.01); *Y10T 29/4932* (2015.01)

(58) Field of Classification Search
CPC ........ F02C 7/28; F01D 11/006; F01D 11/008; F01D 11/08; Y10T 29/4932; F05D 2260/80; F05D 2240/80; F05D 2240/81; F05D 2260/84; F05D 2250/70; F05D 2240/57; F05D 2240/11

USPC ...... 416/193 A, 248, 190, 191, 61; 415/110, 415/173.3, 173.1; 29/889.2
See application file for complete search history.

(56) References Cited

U.S. PATENT DOCUMENTS

| | | |
|---|---|---|
| 8,137,072 B2 | 3/2012 | Kim et al. |
| 2009/0110546 A1 | 4/2009 | Tholen et al. |
| 2010/0111700 A1 | 5/2010 | Kim et al. |
| 2010/0129226 A1 | 5/2010 | Strohl et al. |
| 2012/0189424 A1 | 7/2012 | Propheter-Hinckley et al. |
| 2013/0343878 A1 | 12/2013 | Propheter-Hinckley |
| 2014/0127004 A1* | 5/2014 | Schaeflein ............ F01D 17/20 415/159 |
| 2014/0286781 A1* | 9/2014 | Billings ............... F01D 5/3007 416/219 R |
| 2014/0306003 A1* | 10/2014 | Kotian ................. F01D 21/003 235/375 |

FOREIGN PATENT DOCUMENTS

| | | |
|---|---|---|
| CN | 101533493 | 9/2009 |
| RU | 2159856 | 11/2000 |

(Continued)

*Primary Examiner* — Mark Laurenzi
*Assistant Examiner* — Kelsey Stanek
(74) *Attorney, Agent, or Firm* — Procopio, Cory, Hargreaves & Savitch LLP; James R. Smith

(57) ABSTRACT

A platform seal assembly for a gas turbine engine with a turbine disk and a plurality of turbine blades is disclosed. The platform seal assembly includes a platform seal and a validation tab. The platform seal includes a first end, a second end, opposite and distal to the first end, and a body extending between the first end and the second end. The validation tab includes an attachment portion affixed to the platform seal and an observable indicator portion extending from the attachment portion.

18 Claims, 6 Drawing Sheets

(56) References Cited

FOREIGN PATENT DOCUMENTS

| | | |
|---|---|---|
| RU | 2162556 | 1/2001 |
| WO | 2013188731 | 12/2013 |
| WO | 2014001084 | 1/2014 |

* cited by examiner

TURBINE BLADE PLATFORM SEAL ASSEMBLY VALIDATION

TECHNICAL FIELD

The present disclosure generally pertains to gas turbine engines, and is more particularly directed toward turbine blade platform seal assembly validation.

BACKGROUND

Gas turbine engines include compressor, combustor, and turbine sections. Turbine sections include turbine blades with adjacent slash faces. Heated air or gases from the combustor may pass through a gap between the slash faces, increasing the operating temperature of turbine components.

U.S. Pat. No. 8,137,072 to H. Kim discloses a turbine blade. The turbine blade may have an airfoil extending from a first surface of a turbine platform. The turbine blade may further have a first side pocket of the turbine platform that is configured to substantially entirely house a first moveable seal between a forward wall of the first side pocket and an aft wall of the first side pocket. The first side pocket may have a convex surface, extending between the forward wall and the aft wall, and a concave surface. The turbine blade may also have a second side pocket of the turbine platform configured to receive a portion of a second moveable seal.

The present disclosure is directed toward overcoming one or more of the problems discovered by the inventors.

SUMMARY OF THE DISCLOSURE

A platform seal assembly for a gas turbine engine with a turbine disk and a plurality of turbine blades is disclosed. In one embodiment, the platform seal assembly includes a platform seal and a validation tab. The platform seal includes a first end, a second end, opposite and distal to the first end, and a body extending between the first end and the second end. The validation tab includes an attachment portion affixed to the platform seal and an observable indicator portion extending from the attachment portion.

A method for assembling a turbine disk assembly for a gas turbine engine is also disclosed. The turbine disk assembly including a turbine disk, a plurality of turbine blades, and a plurality of platform seals. In one embodiment, the method includes affixing a validation tab to a platform seal of the plurality of platform seals. The method also includes affixing the platform seal including the validation tab to a turbine blade of the plurality of turbine blades. The method further includes assembling the plurality of turbine blades to the turbine disk with the observable indicator portion extending through a slash face gap between the turbine blade and an adjacent turbine blade of the plurality of turbine blades in an outward radial position relative to the turbine disk. The method yet further includes inspecting the observable indicator portion to verify proper installation of the platform seal. The method further includes removing each validation tab from the platform seal.

DETAILED DESCRIPTION

The systems and methods disclosed herein include a turbine disk assembly. In embodiments, the turbine disk assembly includes a turbine disk, turbine blades, and a platform seal. Each turbine blade includes a pressure side seal slot below the pressure side platform, and a suction side seal slot below the suction side platform. The pressure side seal slot of a first turbine blade and the suction side seal slot of a second turbine blade, adjacent the first turbine blade, combine to form a seal slot. A platform seal is retained within each seal slot and is configured to contact a pressure side sealing surface of the pressure side platform and a suction side sealing surface of the suction side platform of an adjacent turbine blade during operation of the gas turbine engine. Assembling adjacent turbine blades with a platform seal in the seal slot may be a blind assembly and may not be easily validated/inspected. The platform seal may include a validation tab attached to the body of the platform seal that is configured to extend radially outward through the slash face gap, and protrude beyond the pressure side platform and the suction side platform. The validation tab may provide validation that the platform seal is properly installed in the seal slot and that the platform seal is installed with the correct turbine blade and with the correct turbine engine.

Figure 1:
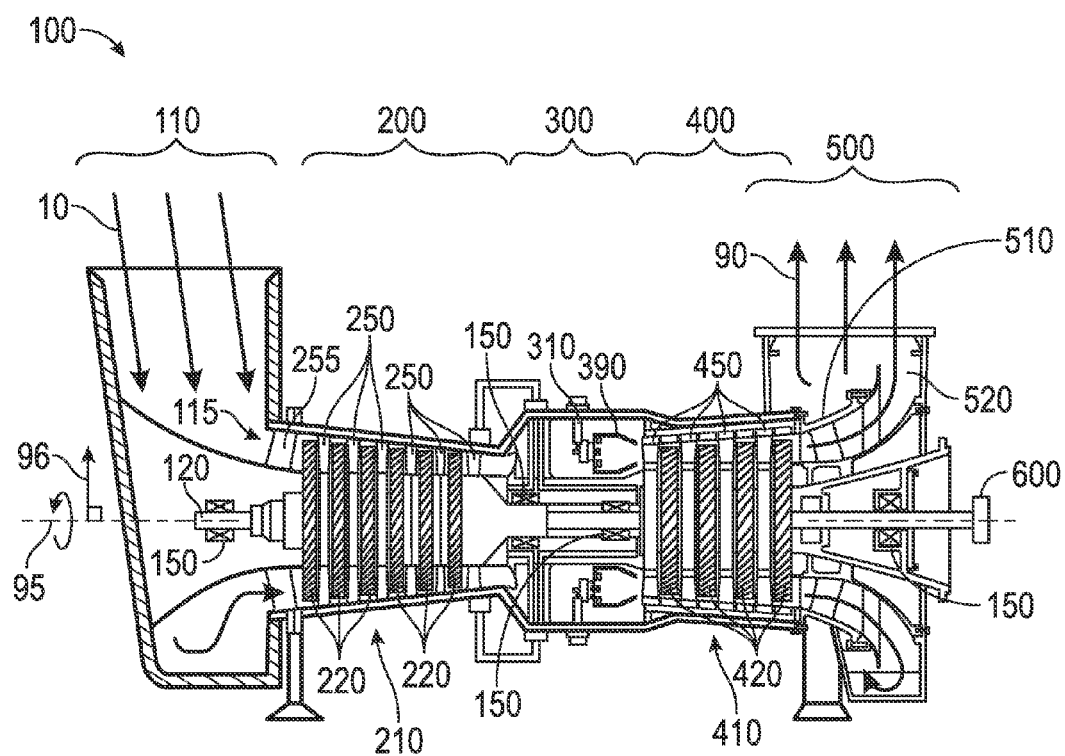
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a gas producer or "compressor" 200, a combustor 300, a turbine 400, an exhaust 500, and a power output coupling 600. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the first compressor stage.

The combustor 300 includes one or more injectors 310 and includes one or more combustion chambers 390.

The turbine 400 includes a turbine rotor assembly 410, and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk 422 (shown in FIG. 2) that is circumferentially populated with turbine blades 460 (shown in FIGS. 2-5). A turbine nozzle 450 axially precedes each of the turbine disk assemblies 420. Each turbine disk assembly 420 paired with the adjacent turbine nozzle 450 that precedes the turbine disk assembly 420 is considered a turbine stage. Turbine 400 includes multiple turbine stages.

The exhaust 500 includes an exhaust diffuser 510 and an exhaust collector 520.

Figure 2:
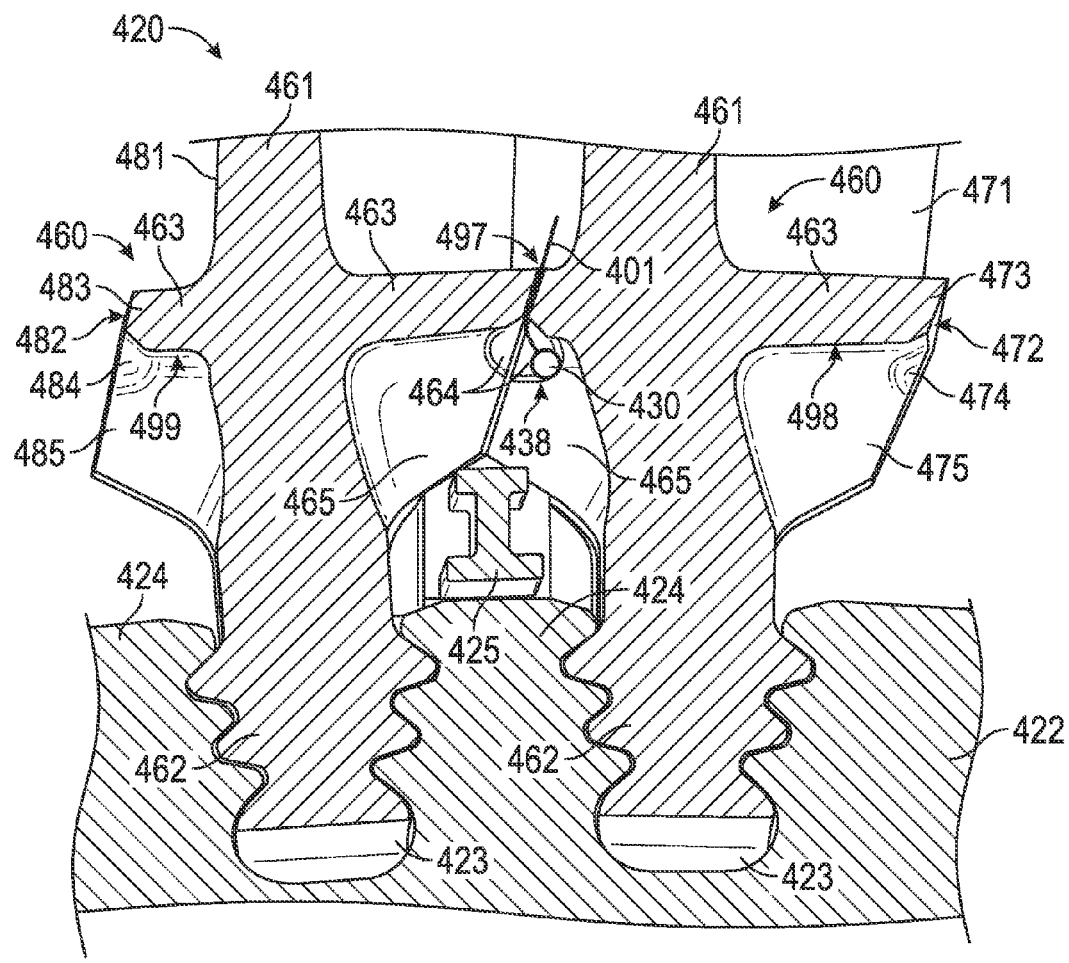
FIG. 2 is a section view of a portion of a turbine disk assembly for the gas turbine engine of FIG. 1.

FIG. 2 is a section view of a portion of a turbine disk assembly 420 for the gas turbine engine of FIG. 1. Turbine disk assembly 420 includes a turbine disk 422, turbine blades 460 (two shown in FIG. 2), dampers 425 (one shown in FIG. 2), and platform seals 430 (one shown in FIG. 2). Turbine disk 422 may be a cylindrical shape and may include disk posts 424 extending radially outward. Adjacent disk posts 424 may form a turbine disk slot 423. Each turbine disk slot 423 may have a fir tree or dovetail shape and is configured to receive a turbine blade 460.

Each turbine blade 460 includes a platform 463, an airfoil 461, and a blade root 462. Airfoil 461 extends outward, in a first direction, from platform 463 forming a leading edge 458 (see FIG. 3), a trailing edge 459 (see FIG. 3), a pressure side 471, and a suction side 481. When turbine blade 460 is installed in turbine disk 422, airfoil 461 extends outward from platform 463. Pressure side 471 spans between leading edge 458 and trailing edge 459 with a concave shape. Suction side 481 is the side opposite pressure side 471 and spans between leading edge 458 and trailing edge 459 with a convex shape.

Blade root 462 extends inward from platform 463, in a second direction, in the direction opposite airfoil 461 or opposite the first direction. When turbine blade 460 is installed in turbine disk 422, blade root 462 extends in the radially inward direction from platform 463. Blade root 462 is the parent component attachment piece and is configured to insert into a turbine disk slot 423. Blade root 462 may have a fir tree or a dovetail shape.

Platform 463 includes a pressure side platform 473 extending out from pressure side 471 and a suction side platform 483 extending out from suction side 481 in the direction opposite pressure side platform 473. When turbine blade 460 is installed in turbine disk 422, pressure side platform 473 extends in a first circumferential direction relative to the axis of turbine disk 422 and suction side platform 483 extends in a second circumferential direction, opposite the first circumferential direction, relative to turbine disk 422.

Pressure side platform 473 includes pressure side slash face 472. Pressure side slash face 472 is the surface at the end of pressure side platform 473 and is distal to airfoil 461. Pressure side slash face 472 may be angled relative to the direction pressure side platform 473 extends. In one embodiment, pressure side slash face 472 is perpendicular to the direction of pressure side platform 473. In another embodiment, pressure side slash face 472 is angled between zero and forty-five degrees from the direction perpendicular to the direction of pressure side platform 473.

Suction side platform 483 includes suction side slash face 482. Suction side slash face 482 is the surface at the end of suction side platform 483 and is distal to airfoil 461. Suction side slash face 482 Suction side slash face 482 may be angled relative to the direction suction side platform 483 extends. In one embodiment, suction side slash face 482 is perpendicular to the direction of suction side platform 483. In another embodiment, suction side slash face 482 is angled between zero and forty-five degrees from the direction perpendicular to the direction of suction side platform 483.

When adjacent turbine blades 460 are installed onto turbine disk 422 the pressure side slash face 472 of a first turbine blade is adjacent to the suction side slash face 482 of a second turbine blade. Pressure side slash face 472 may be parallel to suction side slash face 482. Pressure side slash face 472 of the first turbine blade and suction side slash face 482 of the second turbine blade are configured to form a slash face gap 497 there between.

Turbine disk assembly 420 is configured to include a seal slot 464 below and adjacent each slash face gap 497. A platform seal assembly 438 is installed into each seal slot 464. Each platform seal assembly 438 includes a platform seal 430 and a validation tab 401 extending through the slash face gap 497 and beyond the slash face gap 497 in the same direction as the airfoils 461. Platform seal 430 is configured to fit within seal slot 464 formed by adjacent turbine blades 460. The width of platform seal 430 is configured to be larger than slash face gap 497.

Figure 3:
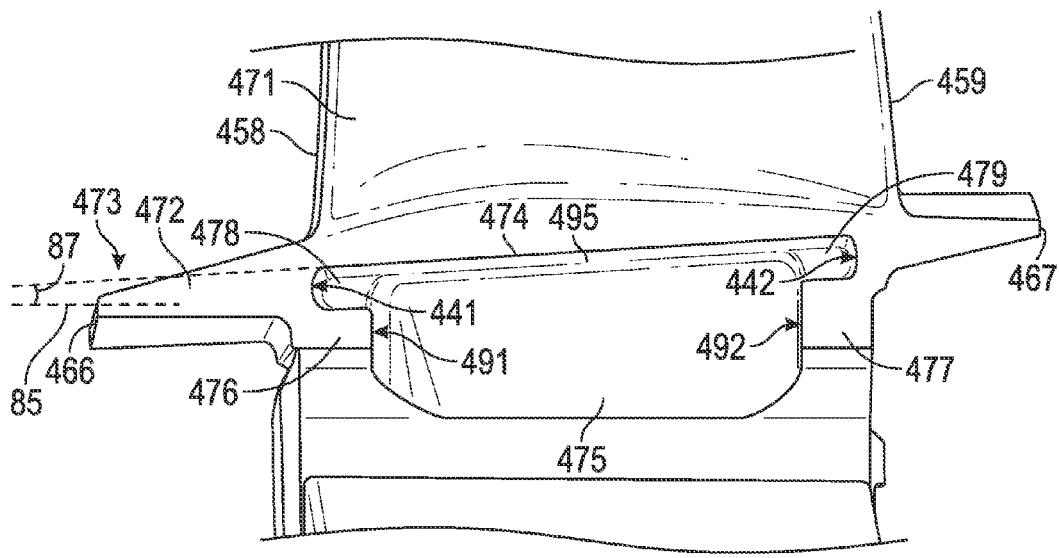
FIG. 3 is a perspective view of the pressure side of a portion of a turbine blade of FIG. 2.

FIG. 3 is a perspective view of the pressure side 471 of a portion of a turbine blade 460 of FIG. 2. Referring to FIG. 3, platform 463 including pressure side platform 473 spans between a forward end 466 and an aft end 467. Leading edge 458 extends out from platform 463 adjacent forward end 466 and trailing edge 459 extends out from platform 463 adjacent aft end 467.

Referring to FIGS. 2 and 3, turbine blade 460 may include forward pressure side damper buttress 476 and aft pressure side damper buttress 477. Forward pressure side damper buttress 476 extends from pressure side platform 473 adjacent the forward end 466 and extends down adjacent blade root 462. Aft pressure side damper buttress 477 extends from pressure side platform 473 adjacent the aft end 467 and extends down adjacent blade root 462.

Pressure side platform 473, forward pressure side damper buttress 476, and aft pressure side damper buttress 477 may be configured to form pressure side underplatform pocket 475. Pressure side platform 473 may include pressure side underplatform surface 498 adjacent pressure side underplatform pocket 475, forward pressure side damper buttress 476 may include forward pressure damper surface 491 adjacent pressure side underplatform pocket 475, and aft pressure side damper buttress 477 may include aft pressure damper surface 492 adjacent pressure side underplatform pocket 475. Aft pressure damper surface 492 may be parallel to forward pressure damper surface 491 and perpendicular to pressure side underplatform surface 498. Aft pressure damper surface 492 faces forward pressure damper surface 491, and forward pressure damper surface 491 faces aft pressure damper surface 492.

Figure 4:
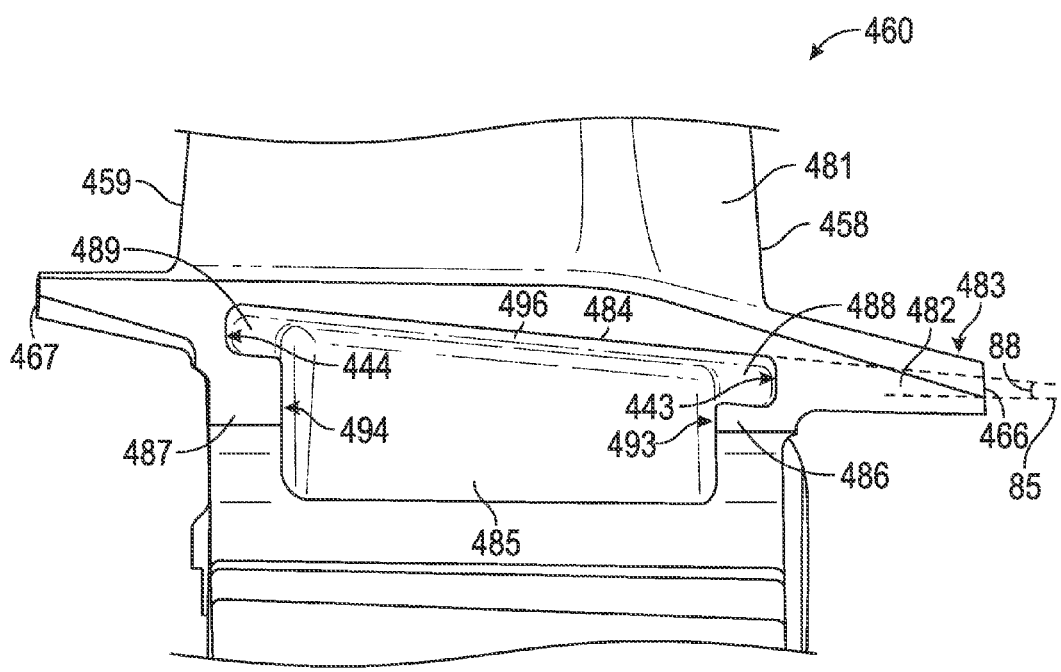
FIG. 4 is a perspective view of the suction side of a portion of the turbine blade of FIG. 2.

FIG. 4 is a perspective view of the suction side 481 of a portion of the turbine blade of FIG. 2. Referring to FIG. 4, turbine platform 463 including suction side platform 483 spans between forward end 466 and aft end 467. Referring to FIGS. 2 and 4, turbine blade 460 may also include forward suction side damper buttress 486 and aft suction side damper buttress 487. Forward suction side damper buttress 486 extends from suction side platform 483 adjacent the forward end 466 and extends down adjacent blade root 462. Aft suction side damper buttress 487 extends from suction side platform 483 adjacent the aft end 467 and extends down adjacent blade root 462.

Suction side platform 483, forward suction side damper buttress 486, and aft suction side damper buttress 487 may be configured to form suction side underplatform pocket 485. Suction side platform 483 may include suction side underplatform surface 499 adjacent suction side underplatform pocket 485, forward suction side damper buttress 486 may include forward suction damper surface 493 adjacent suction side underplatform pocket 485, and aft suction side damper buttress 487 may include aft suction damper surface 494 adjacent suction side underplatform pocket 485. Aft suction damper surface 494 may be parallel to forward suction damper surface 493 and perpendicular to suction side underplatform surface 499. Aft suction damper surface 494 faces forward suction damper surface 493, and forward suction damper surface 493 faces aft suction damper surface 494.

Referring to FIG. 2, the damper buttresses including aft pressure side damper buttress 477 and aft suction side damper buttress 487, are configured to hold a damper 425. Each damper 425 is installed radially outward from and adjacent to each disk post 424 between two turbine blades 460 and radially inward from the adjacent pressure side platform 473 and suction side platform 483 of the two turbine blades 460. The pressure side underplatform pocket 475 and the suction side underplatform pocket 485 of adjacent turbine blades 460 are configured to form underplatform pocket 465.

Each turbine blade 460 includes a pressure side seal slot 474 below pressure side platform 473 and a suction side seal slot 484 below suction side platform 483. Adjacent turbine blades 460 are also configured to form seal slot 464 with a pressure side seal slot 474 of a first turbine blade and the adjacent suction side seal slot 484 of a second turbine blade. Referring to FIG. 3, pressure side seal slot 474 may include forward pressure side slot 478, aft pressure side slot 479, and pressure side sealing surface 495. Forward pressure side slot 478 may extend into pressure side platform 473 from pressure side slash face 472 below the leading edge 458, adjacent to forward pressure side damper buttress 476, and above forward pressure side damper buttress 476. Forward pressure side slot 478 may include forward pressure side surface 441. Forward pressure side surface 441 may have a planar or a rounded surface, and may round into the concave shape of forward pressure side slot 478. Forward pressure side surface 441 may be situated forward of leading edge 458, opposite the direction of trailing edge 459, and axially forward of leading edge 458 when turbine blade 460 is installed onto turbine disk 422. Forward pressure side slot 478 may have a concave shape and may span from pressure side underplatform pocket 475 to forward pressure side surface 441, beyond leading edge 458.

Aft pressure side slot 479 may extend into pressure side platform 473 from pressure side slash face 472 below the trailing edge 459, adjacent to aft pressure side damper buttress 477, and above aft pressure side damper buttress 477. Aft pressure side slot 479 may include aft pressure side surface 442. Aft pressure side surface 442 may be distal to leading edge 458 and may be the end surface of pressure side seal slot 474 farthest from leading edge 458. Aft pressure side surface 442 may have a planar or a rounded surface, and may round into the concave shape of aft pressure side slot 479. Aft pressure side slot 479 may have a concave shape and spans from pressure side underplatform pocket 475 to aft pressure side surface 442.

Pressure side sealing surface 495 may span between forward pressure side surface 441 and aft pressure side surface 442, the length of pressure side seal slot 474. Pressure side sealing surface 495 may be a planar surface angling into pressure side platform 473 from pressure side slash face 472. Forward pressure side slot 478 may include the forward portion of pressure side sealing surface 495. Aft pressure side slot 479 may include the aft portion of pressure side sealing surface 495. The portion of pressure side sealing surface 495 between forward pressure side slot 478 and aft pressure side slot 479 may angle into pressure side platform 473 to pressure side underplatform pocket 475.

Pressure side seal slot 474 may span along pressure side slash face 472 at an angle with forward pressure side slot 478 angled toward forward end 466 and in the direction that blade root 462 extends from platform 463, and with aft pressure side slot 479 angled toward aft end 467 and in the direction that airfoil 461 extends from platform 463. Pressure side seal slot 474 may be angled relative to a reference axis. The reference axis is coaxial to the axis of turbine disk 422 when turbine blade 460 is installed onto turbine disk 422 and is coaxial to center axis 95 (shown in FIG. 1), the centerline of gas turbine engine 100, when turbine blade 460 is installed within gas turbine engine 100. The description with regard to the reference axis applies to the axis of turbine disk 422 when turbine blade 460 is installed onto turbine disk 422 and to center axis 95 when turbine blade 460 is installed within gas turbine engine 100. The reference axis includes a forward direction extending toward compressor 200 when turbine blade 460 is installed within gas turbine engine 100 and an aft direction extending away from compressor 200 when turbine blade 460 is installed within gas turbine engine 100.

Pressure side seal slot 474 may be angled in the radial direction relative to the reference axis with forward pressure side slot 478 being closer to the reference axis than aft pressure side slot 479. Angle 87 is the angle of pressure side seal slot 474 relative to the reference axis. Reference line 85 is shown to illustrate angle 87. Reference line 85 is parallel to the reference axis and is shifted radially outward from the reference axis. In one embodiment, pressure side seal slot 474 is angled relative to the reference axis in the radial direction from zero to ten degrees. In another embodiment, pressure side seal slot 474 is angled relative to the reference axis in the radial direction from four to six degrees. In yet another embodiment, pressure side seal slot 474 is angled relative to the reference axis in the radial direction at five degrees, approximately five degrees, or within a predetermined tolerance of five degrees.

Pressure side sealing surface 495 spans along pressure side slash face 472 at an angle with the forward portion of pressure side sealing surface 495 being angled toward forward end 466 and in the direction that blade root 462 extends from platform 463, and with the aft portion of pressure side sealing surface 495 being angled toward aft end 467 and in the direction that airfoil 461 extends from platform 463.

Pressure side sealing surface 495 may be angled relative to the reference axis. Angle 87 also illustrates the angle of pressure side sealing surface 495 relative to the reference axis. Pressure side sealing surface 495 may be angled in the radial direction relative to the reference axis with the forward portion of pressure side sealing surface 495 being closer to the reference axis than the aft portion of pressure side sealing surface 495. In one embodiment, pressure side sealing surface 495 is angled relative to the reference axis in the radial direction from zero to ten degrees. In another embodiment, pressure side sealing surface 495 is angled relative to the reference axis in the radial direction from four to six degrees. In yet another embodiment, pressure side sealing surface 495 is angled relative to the reference axis in the radial direction at five degrees, approximately five degrees, or within a predetermined tolerance of five degrees.

In the embodiment shown, pressure side sealing surface 495 is the radially outer portion of pressure side seal slot 474 relative to the reference axis.

Referring to FIG. 4, suction side seal slot 484 may include forward suction side slot 488, aft suction side slot 489, and suction side sealing surface 496. Forward suction side slot 488 may extend into suction side platform 483 from suction side slash face 482 below the leading edge 458, adjacent to forward suction side damper buttress 486, and above forward suction side damper buttress 486. Forward suction side slot 488 may include forward suction side surface 443. Forward suction side surface 443 may have a planar or a rounded surface, and may round into the concave shape of forward suction side slot 488. Forward suction side surface 443 may be situated forward of leading edge 458, opposite the direction of trailing edge 459, and axially forward of leading edge 458 when turbine blade 460 is installed onto turbine disk 422. Forward suction side slot 488 may have a concave shape and spans from suction side underplatform pocket 485 to forward suction side surface 443, beyond leading edge 458.

Aft suction side slot 489 may extend into suction side platform 483 from suction side slash face 482 below the trailing edge 459, adjacent to aft suction side damper buttress 487, and above aft suction side damper buttress 487. Aft suction side slot 489 may include aft suction side surface 444. Aft suction side surface 444 may be distal to leading edge 458 and may be the end surface of suction side seal slot 484 farthest from leading edge 458. Aft suction side surface 444 may have a planar or a rounded surface, and may round into the concave shape of aft suction side slot 489. Aft suction side slot 489 may have a concave shape and spans from suction side underplatform pocket 485 to aft suction side surface 444.

Suction side sealing surface 496 may span between forward suction side surface 443 to aft suction side surface 444, the length of suction side seal slot 484. Suction side sealing surface 496 may be a planar surface angling into suction side platform 483 from suction side slash face 482. Forward suction side slot 488 may include the forward portion of suction side sealing surface 496. Aft suction side slot 489 may include the aft portion of suction side sealing surface 496. The portion of suction side sealing surface 496 between forward suction side slot 488 and aft suction side slot 489 may angle into suction side platform 483 to suction side underplatform pocket 485.

Suction side seal slot 484 may span along suction side slash face 482 at an angle with forward suction side slot 488 angled toward forward end 466 and in the direction that blade root 462 extends from platform 463, and with aft suction side slot 489 angled toward aft end 467 and in the direction that airfoil 461 extends from platform 463. Suction side seal slot 484 may be angled relative to the reference axis.

Suction side seal slot 484 may be angled in the radial direction of the reference axis with forward suction side slot 488 being closer to the reference axis than aft suction side slot 489. Angle 88 is the angle of suction side seal slot 484 relative to the reference axis. Reference line 85 is shown to illustrate angle 88. In one embodiment, suction side seal slot 484 is angled relative to the reference axis in the radial direction from zero to ten degrees. In another embodiment, suction side seal slot 484 is angled relative to the reference axis in the radial direction from four to six degrees. In yet another embodiment, suction side seal slot 484 is angled relative to the reference axis in the radial direction at five degrees, approximately five degrees, or within a predetermined tolerance of five degrees. The angles of suction side seal slot 484 and of pressure side seal slot 474 in the radial direction relative to the reference axis of turbine disk 422 are equal or within a predetermined tolerance.

Suction side sealing surface 496 may span along suction side slash face 482 at an angle with the forward portion of suction side sealing surface 496 being angled toward forward end 466 and in the direction that blade root 462 extends from platform 463, and with the aft portion of suction side sealing surface 496 being angled toward aft end 467 and in the direction that airfoil 461 extends from platform 463. Suction side sealing surface 496 may be angled relative to the reference axis.

Suction side sealing surface 496 may be angled in the radial direction relative to the reference axis with the forward portion of suction side sealing surface 496 being closer to the reference axis than the aft portion of suction side sealing surface 496. Angle 88 also illustrates the angle of suction side sealing surface 496 relative to the reference axis. In one embodiment, suction side sealing surface 496 is angled relative to the reference axis in the radial direction from zero to ten degrees. In another embodiment, suction side sealing surface 496 is angled relative to the reference axis in the radial direction from four to six degrees. In yet another embodiment, suction side sealing surface 496 is angled relative to the reference axis in the radial direction at five degrees, approximately five degrees, or within a predetermined tolerance of five degrees. The angles of suction side sealing surface 496 and of pressure side sealing surface 495 in the radial direction relative to the reference axis are equal or within a predetermined tolerance.

In the embodiment shown, suction side sealing surface 496 is the radially outer portion of suction side seal slot 484 relative to the reference axis.

Figure 5:
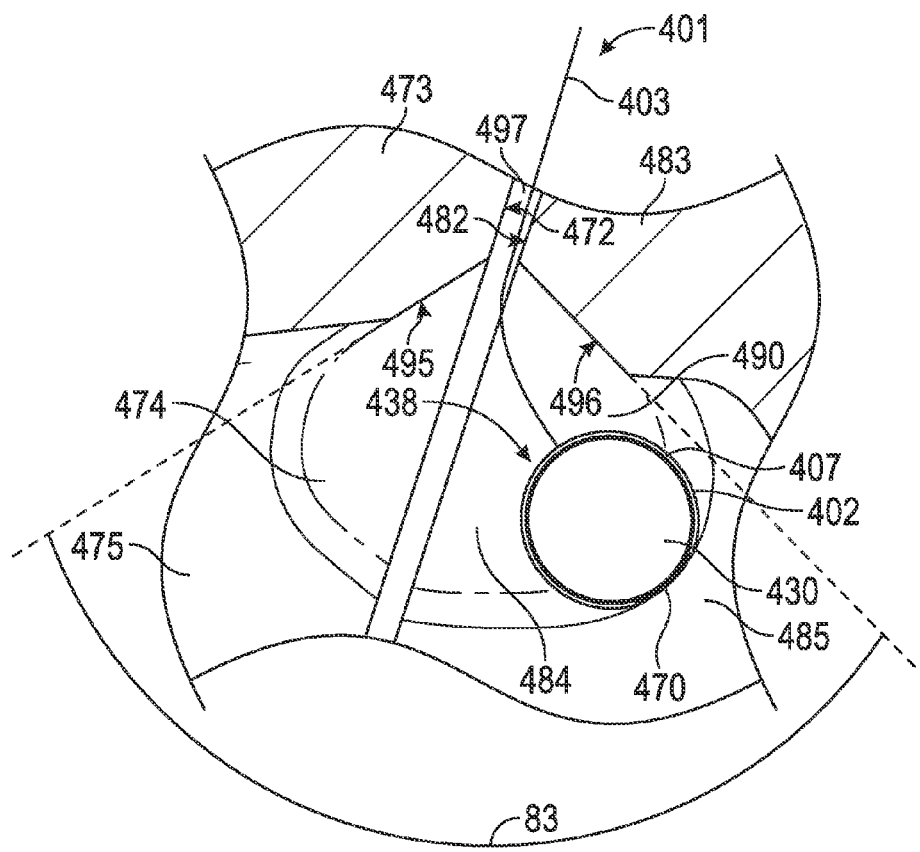
FIG. 5 is a detailed view of the portion of the section view of FIG. 2 around the platform seal assembly.

FIG. 5 is a detailed view of the portion of the section view of FIG. 2 around the platform seal assembly 438. Referring to FIGS. 2 and 5, pressure side sealing surface 495 may extend from pressure side slash face 472 to pressure side underplatform surface 498.

Pressure side sealing surface 495 may be a planar surface angling into pressure side platform 473 from pressure side slash face 472. Pressure side sealing surface 495 may be angled from pressure side slash face 472 towards blade root 462 in the direction opposite the direction that pressure side platform 473 extends and in the same direction that blade root 462 extends. Suction side sealing surface 496 may be a planar surface angling into suction side platform 483 from suction side slash face 482. Suction side sealing surface 496 may be angled from suction side slash face 482 towards blade root 462 in the direction opposite the direction that suction side platform 483 extends and in the same direction that blade root 462 extends.

Pressure side sealing surface 495 and suction side sealing surface 496 may form a roof at the top of seal slot 464. Angle 83 is the angle between pressure side sealing surface 495 and suction side sealing surface 496. In one embodiment, the angle 83 between pressure side sealing surface 495 and suction side sealing surface 496 is between ninety-five degrees and one-hundred fifteen degrees. In another embodiment, the angle 83 between pressure side sealing surface 495 and suction side sealing surface 496 is between one-hundred degrees and one-hundred ten degrees. In yet another embodiment, the angle 83 between pressure side sealing surface 495 and suction side sealing surface 496 is one-hundred five degrees or approximately one-hundred five degrees.

Figure 6:
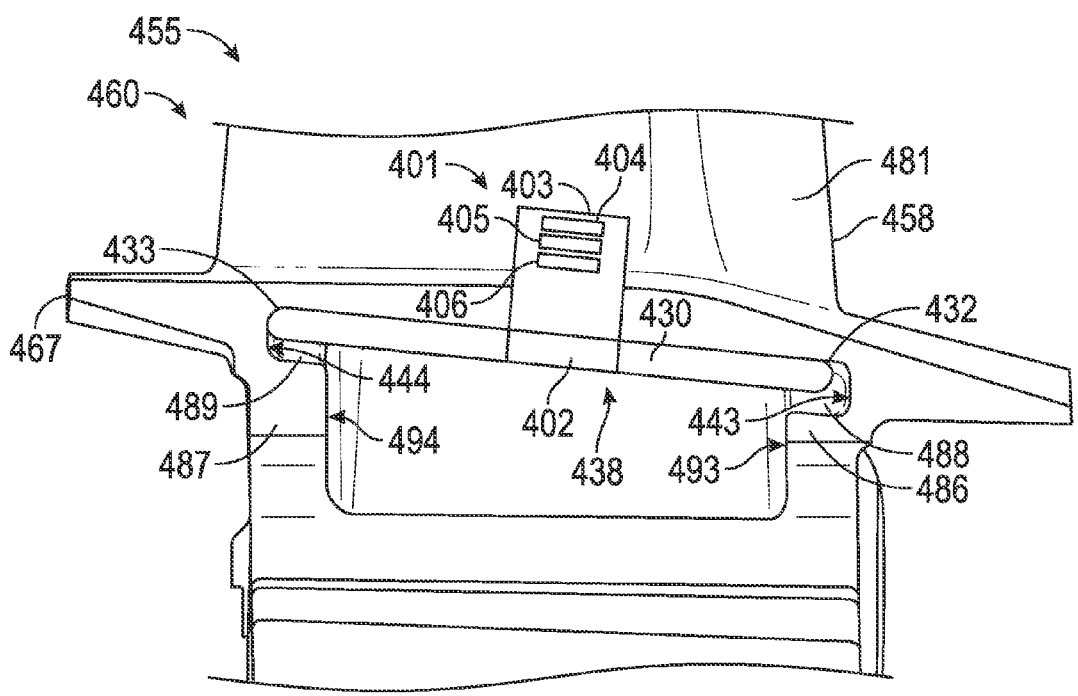
FIG. 6 is a perspective view of the suction side of the turbine blade assembly including the portion of the turbine blade of FIG. 4 and the platform seal assembly.

FIG. 6 is a perspective view of the suction side 481 of the turbine blade assembly 455 including the portion of the turbine blade 460 of FIG. 4 and the platform seal assembly 438. Prior to installing turbine blades 460 to turbine disk 422 as part of turbine disk assembly 420, a platform seal assembly 438 is affixed to each turbine blade 460. In the embodiment illustrated, platform seal assembly 438 is affixed to turbine blade 460 within suction side seal slot 484 to accommodate installing turbine blade 460 axially from the aft side of turbine disk 422. In other embodiments, the platform seal assembly 438 may be affixed to seal slot 464 in pressure side seal slot 474 or suction side seal slot 484. Platform seal assembly 438 may be affixed to a turbine blade 460 with an adhesive 470 such as glue or tape, or may be affixed by other methods.

In the embodiment illustrated, platform seal assembly 438 includes platform seal 430 and validation tab 401. Platform seal 430 includes a first end 432, a second end 433, and a body 431 extending there between. Validation tab 401 is affixed to platform seal 430. In the embodiment illustrated, validation tab 401 is affixed to body 431. Validation tab 401 may also be affixed to first end 432 or second end 433. Validation tab 401 can be shaped in a variety of ways, such as rectangular, triangular, circular, trapezoidal, etc.

Referring to FIGS. 5 and 6, validation tab 401 may include an attachment portion 402 and an observable indicator portion 403. Attachment portion 402 is configured to attach validation tab 401 to platform seal 430. Attachment portion 402 may attach validation tab 401 to platform seal 430 by any means to sufficiently secure validation tab 401 to platform seal 430. Attachment portion 402 may include an adhesive 407, such as glue or tape to affix attachment portion 402 to platform seal 430. In the embodiment illustrated, attachment portion 402 wraps completely around platform seal 430 at body 431. In other embodiments, attachment portion 402 does not wrap completely around platform seal 430, attaching to a portion of body 431, first end 432, and/or second end 433. For example, attachment portion 402 may include a rectangular shape with a length less than the length of body 431, such as one inch, and with a width less than a perimeter length of body 431.

Observable indicator portion 403 extends from attachment portion 402. Observable indicator portion 403 may extend from attachment portion 402 perpendicular to body 431. Observable indicator portion 403 may also be configured to extend from attachment portion 402 and through slash face gap 497. Observable indicator portion 403 includes one or more validation codes, such as a first validation code 404, a second validation code 405, and a third validation code 406. Each of the first validation code 404, the second validation code 405, and the third validation code 406 may be a platform seal validation code, a turbine blade validation code, or an engine validation code.

The platform seal validation code is a code used to identify a particular platform seal 430 to be installed within a particular turbine blade assembly 455 and attached to a particular turbine blade 460. The platform seal validation code may be a part number for the particular platform seal 430, or may be a code associated with the part number for the particular platform seal 430, such as an alphanumeric code, a machine readable code, or a color code.

The turbine blade validation code is a code used to identify a particular turbine blade 460 that the particular platform seal 430 should be affixed to. The turbine blade validation code may be a part number for the particular turbine blade 460, or may be a code associated with the part number for the particular turbine blade 460, such as an alphanumeric code, a machine readable code, or a color code.

The engine validation code is a code used to identify a particular gas turbine engine 100 that the turbine blade 460 and the platform seal 430 can be installed in. The engine validation code may be a part number for the particular gas turbine engine 100, or may be a code associated with the part number for the particular gas turbine engine 100, such as an alphanumeric code, a machine readable code, or a color code. In some embodiments, the entire validation tab 401 is color coded to a particular configuration or model of the gas turbine engine 100. In other embodiments, a portion of the validation tab 401 is color coded to a particular configuration or model of the gas turbine engine 100.

Platform seal 430 is assembled within the seal slot 464 with the validation tab 401 affixed to the platform seal 430 and the observable indicator portion 403 being visible. Platform seal assembly 438 may be affixed to seal slot 464 so that observable indicator portion 403 extends from platform seal 430 on the blade root 462 side of platform 463 beyond platform 463 on the airfoil 461 side of platform 463 so that each validation code is visible on the airfoil 461 side of platform 463.

Platform seal 430 may be configured to extend from forward suction side slot 488 to aft suction side slot 489. When platform seal 430 is in contact with forward suction side surface 443, platform seal 430 may be configured to extend beyond aft suction damper surface 494 and into aft suction side slot 489, overlapping with aft suction side damper buttress 487. When platform seal 430 is in contact with aft suction side surface 444, platform seal 430 may be configured to extend beyond forward suction damper surface 493 and into forward suction side slot 488, overlapping with forward suction side damper buttress 486. In some embodiments, platform seal 430 is also configured to extend beyond leading edge 458 in the axial direction of the reference axis when platform seal 430 is in contact with aft suction side surface 444.

Platform seal 430 may interact with pressure side seal slot 474, forward pressure side slot 478, aft pressure side slot 479, forward pressure side damper buttress 476, aft pressure side damper buttress 477, forward pressure side surface 441, aft pressure side surface 442, forward pressure damper surface 491, and aft pressure damper surface 492 in the same or a similar manner as platform seal 430 interacts with suction side seal slot 484, forward suction side slot 488, aft suction side slot 489, forward suction side damper buttress 486, aft suction side damper buttress 487, forward suction side surface 443, aft suction side surface 444, forward suction damper surface 493, and aft suction damper surface 494 as described above.

Figure 7:
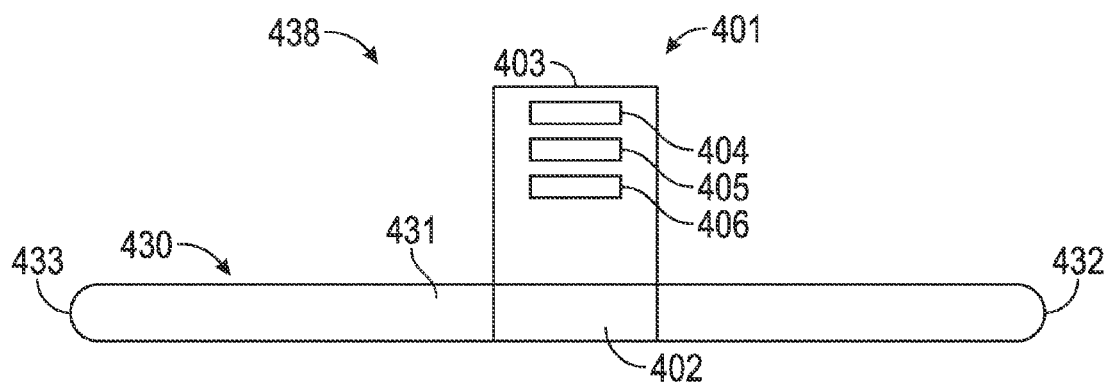
FIG. 7 is a side view of the platform seal assembly of FIGS. 2, 5, and 6.

FIG. 7 is a side view of the platform seal assembly 438 of FIGS. 2, 5, and 6. In the embodiment shown in FIG. 7, body 431 has a cylindrical shape extending from first end 432 to second end 433. Body 431 may be a circular cylinder, such as a right circular cylinder. In the embodiment shown, first end 432 is a hemisphere or includes a hemispherical shape and second end 433 is a hemisphere or includes a hemispherical shape. First end 432 and second end 433 are at opposite ends of body 431. In other embodiments, first end 432 and second end 433 are circular bases at each end of body 431; the edges between body 431 and first end 432, and body 431 and second end 433 may be rounded.

In one embodiment, the diameter of platform seal 430 is from 2.362 mm (0.093 inches) to 2.464 mm (0.097 inches). In another embodiment, the diameter of platform seal 430 is 2.413 mm (0.095 inches) or within a predetermined tolerance of 2.413 mm (0.095 inches).

In one embodiment, the length of platform seal 430 is from 42.037 mm (1.655 inches) to 42.291 mm (1.665 inches). In another embodiment the length of platform seal 430 is 42.164 mm (1.660 inches) or within a predetermined tolerance of 42.164 mm (1.660 inches).

The width of validation tab 401 extending between first end 432 and second end 433 may be large enough to fit a part number or an alphanumeric code of any of the validation codes. The length of validation tab 401 extending away from body 431 may be long enough so that each validation code is visible above platform 463 when platform seal 430 is installed within the turbine disk assembly 420.

Figure 8:
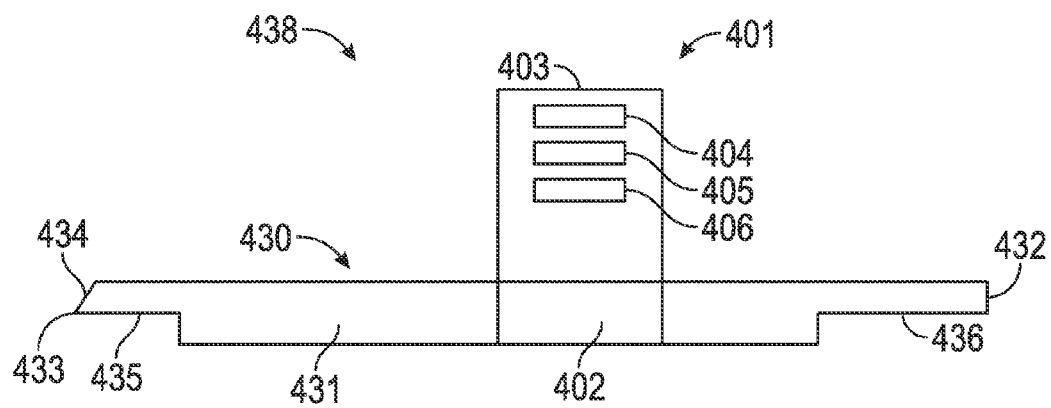
FIG. 8 is a side view of an alternate embodiment of the platform seal assembly of FIG. 7.

FIG. 8 is a side view of an alternate embodiment of the platform seal assembly 438 of FIG. 7. In this embodiment, body 431 is a circular cylinder extending from first end 432 to second end 433. In the embodiment shown in FIG. 8, platform seal 430 includes a first flat 436, a second flat 435, and an angled flat 434. First flat 436 is adjacent first end 432 and may be parallel to the axis of body 431. Second flat 435 is adjacent second end 433, may be parallel to first flat 436, and may be parallel to the axis of body 431. Angled flat 434 is adjacent second end 433 and extends at an angle from second flat 435 in a direction towards first end 432. In one embodiment, angled flat 434 is angled from fifty degrees to sixty degrees relative to second flat 435.

Figure 9:
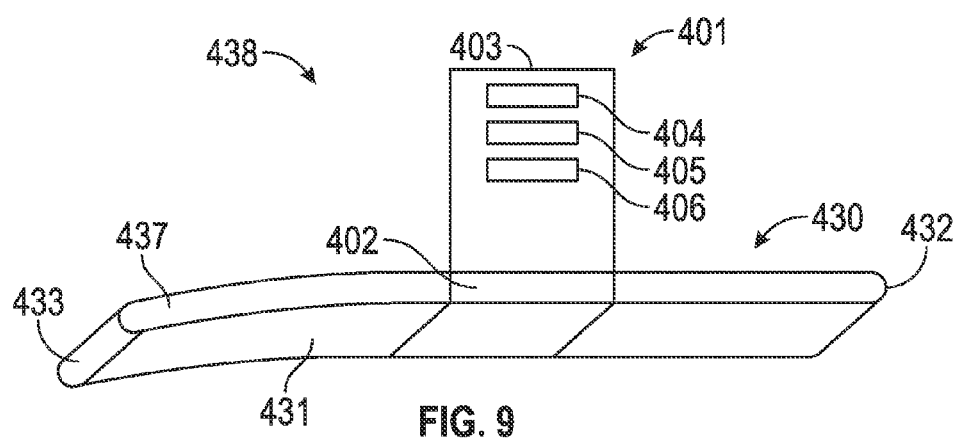
FIG. 9 is a perspective view of an alternate embodiment of the platform seal assemblies of FIGS. 7 and 8.

FIG. 9 is a perspective view of an alternate embodiment of the platform seal assemblies 438 of FIGS. 7 and 8. In the embodiment illustrated in FIG. 9, body 431 is a plate extending between first end 432 and second end 433. Body 431 may include a parallelepiped shape and may include a curved portion 437 adjacent second end 433. The sides and bases of the parallelepiped shape may be rounded. In one embodiment, the cross-section of body 431 is a stadium shape, a rectangle with circular capped ends. In other embodiments, the cross-section of body 431 is a rectangle with rounded edges.

Referring to FIGS. 2 and 5, during operation of gas turbine engine 100, platform seal 430 is located adjacent to and configured to contact pressure side sealing surface 495 and suction side sealing surface 496. In some embodiments, platform seal 430 is angled from zero to ten degrees in the radial direction relative to center axis 95 during operation of gas turbine engine 100. In other embodiments, platform seal 430 is angled from four to six degrees in the radial direction relative to center axis 95 during operation of gas turbine engine 100.

When the gas turbine engine 100 is not in operation seal slot 464 retains platform seal 430. The concave surfaces of forward suction side slot 488 (not shown in FIGS. 2 and 5) and aft suction side slot 489 are configured to include a storage cavity 490 to retain platform seal 430. In some embodiments, platform seal 430 does not extend beyond suction side slash face 482 when platform seal 430 is retained by storage cavity 490.

The concave surfaces of forward pressure side slot 478 (not shown in FIGS. 2 and 5) and aft pressure side slot 479 are configured to direct platform seal 430 into the roof formed by pressure side sealing surface 495 and suction side sealing surface 496 as centrifugal force overcomes gravity and to direct platform seal 430 to storage cavity 490 as gravity overcomes centrifugal force; forward suction side slot 488 and aft suction side slot 489 are similarly configured.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys. In embodiments, platform seal 430 is made from HAYNES 25 and turbine disk 422 is made from WASPALOY. Validation tab 401 may be made from a combustible material that will burn off completely during first engine light off of the gas turbine engine, such as paper, plastic, etc.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel is added. Air 10 and fuel are injected into the combustion chamber 390 via injector 350 and combusted. Energy is extracted from the combustion reaction via the turbine 400 by each stage of the series of turbine disk assemblies 420. Exhaust gas 90 may then be diffused in exhaust diffuser 510, collected and redirected. Exhaust gas 90 exits the system via an exhaust collector 520 and may be further processed (e.g., to reduce harmful emissions, and/or to recover heat from the exhaust gas 90).

Referring to FIGS. 1 and 2, air 10 is heated from the combustion reaction and is directed through turbine 400. Some of the heated air may pass through slash face gaps 497 between turbine blades 460, may impinge on disk posts 424 and dampers 425, and may increase the temperature of the portions of the turbine blades 460. During operation of gas turbine engine 100, centrifugal force may locate platform seal 430 against pressure side sealing surface 495 and suction side sealing surface 496 of adjacent turbine blades 460, which may prevent or impede the flow of heated air through the slash face gap 497 and may prevent impingement on disk posts 424 and dampers 425. Preventing or impeding the flow of heated air through the slash face gap 497 may reduce the temperature of these components, which may increase the creep life and the service life of these components.

Platform seals 430 are located between adjacent turbine blades 460 in a turbine disk assembly 420, which may create a blind assembly that may be time consuming to install correctly and may be difficult to validate and inspect. Platform seals 430 may not be visible through the slash face gap 497. A validation tab 401 attached to the platform seal 430 with an observable indicator portion 403 of the validation tab 401 extending radially through the slash face gap 497 may provide a quick validation and inspection of the turbine disk assembly 420 to verify that each seal slot 464 includes a platform seal 430. The position and orientation of validation tab 401 with respect the platform 463 may confirm that the platform seal 430 is oriented correctly within the seal slot 464.

Various gas turbine engines may use different platform seals 430 that may be similar, but vary in geometry. These platform seals 430 may be mistakenly installed into the wrong turbine disk assembly 420. Validation codes, such as the platform seal validation code, the turbine blade validation code, and the engine validation code may provide for a quick confirmation that the platform seal 430 is the correct platform seal 430 to be affixed to a particular turbine blade 460 and that the platform seal 430 is the correct platform seal 430 installed within the proper turbine disk assembly 420 of a given gas turbine engine 100 prior to and after installation of the turbine blades 460.

Verification that the correct platform seal 430 is affixed to a turbine blade 460 and in the proper position may reduce the installation times of turbine blades 460 by eliminating potential binding of the turbine blades 460 as they are installed and may eliminate potential binding when turbine blades are changed/moved during balancing. Such binding may occur from a platform seal 430 being affixed to a turbine blade 460 in the wrong location or from the wrong platform seal 430 being affixed to a turbine blade 460.

Figure 10:
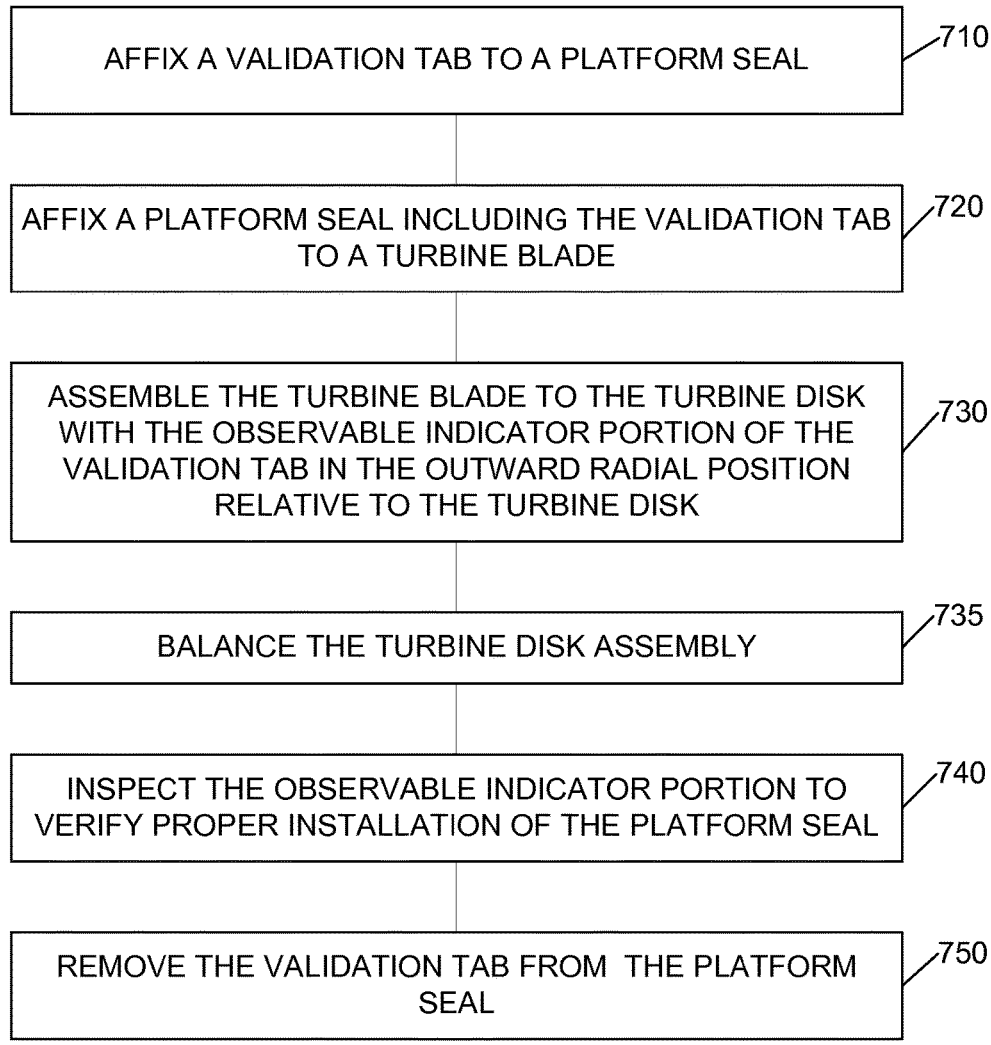
FIG. 10 is a flowchart of a method for assembling a turbine disk assembly including platform seals.

FIG. 10 is a flowchart of a method for assembling a turbine disk assembly 420 including platform seals 430. The method includes affixing a validation tab 401 a platform seal 430 at step 710. The validation tab 401 may include one or more validation codes, such as the first validation code 404, the second validation code 405, and the third validation code 406. The validation tab 401 may be color coded to the engine for one or more of the validation codes.

The method also includes affixing the platform seal 430 including the validation tab 401 to a turbine blade 460 at step 720. The platform seal 430 may be affixed to the turbine blade 460 so that each validation code of the validation tab 401 is located on the airfoil 460 side of the platform 463. Step 720 may include affixing the platform seal 430 within the seal slot 464. In some embodiments, the platform seal 430 is within the suction side seal slot 484. In other embodiments, the platform seal 430 is within the pressure side seal slot 474. Each turbine blade 460 of the turbine disk assembly may have a platform seal 430 with a validation tab 401 affixed to it.

The method further includes assembling the turbine blade 460 to the turbine disk 422 with the observable indicator portion 403 in the outward radial position relative to the turbine disk 422 at step 730. Each observable indicator portion 403 extends outward from the platform seal 430 through a slash face gap 497 between the turbine blade 460 and an adjacent turbine blade 460. In embodiments where the observable indicator portion 403 includes one or more validation codes, with the one or more validation codes are located radially outward from the platform 463.

Assembling the turbine blade 460 to the turbine disk 422 may include balancing the turbine disk assembly 420 at step 735. Balancing the turbine disk assembly 420 may include adding/removing weight from the turbine disk assembly 420 and may also include redistributing the weight of the turbine disk assembly 420 by moving some of the turbine blades 460 to other turbine disk slots 423.

Step 730 is followed by inspecting the observable indicator portion 403 to verify proper installation of the platform seal 430 at step 740. Inspecting the observable indicator portion 403 to verify proper installation of the platform seal 430 may include checking for the visual existence of the validation tab 401, checking the position and orientation of the observable indicator portion 403 with respect to platform 463, and inspecting the validation code(s). Checking for the visual existence of the validation tab 401 may ensure that the platform seal 430 is present between platforms 463. Checking the position and orientation of the observable indicator portion 403 with respect to platform 463 may ensure that the platform seal 430 is oriented correctly in the seal slot 464. Inspecting the validation code(s) may verify that the correct platform seal 430 was installed.

Step 740 is followed by removing the validation tab 401 from the platform seal 430 at step 750. Validation tab 401 may be removed from platform seal 430 after installing turbine blades 460 onto turbine disk 422 to form turbine disk assembly 420, after validation is no longer needed. In one embodiment, validation tab 401 is constructed of a material that will burn off during operation of gas turbine engine 100, such as paper. Validation tab 401 may be removed by burning all or at least a portion of validation tab 401 during operation of the gas turbine engine 100, such as during first engine light off. In another embodiment, validation tab 401 is configured to be removed from body 431 by applying a radial force to validation tab 401 relative to turbine disk assembly 420 after forming turbine disk assembly 420. In yet another embodiment, a portion of validation tab 401 including the validation codes is removed by applying a force to the validation tab 401, while the remainder is removed by combustion during first engine light off. The portions of validation tabs 401 removed including the validation codes may provide a historical record as to which platform seals 430 were installed within the turbine disk assembly 420. Partial or complete removal of the validation tabs 401 may also prevent the impediment of any downstream manufacturing processes.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes particular turbine blades and platform seals, it will be appreciated that the turbine blades and platform seals in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A platform seal assembly for a gas turbine engine with a turbine disk and a plurality of turbine blades, the platform seal assembly comprising:
   a platform seal including
      a first end,
      a second end, opposite and distal to the first end, and
      a body extending between the first end and the second end; and
   a validation tab including
      an attachment portion affixed to the platform seal, and
      an observable indicator portion extending from the attachment portion; and
   wherein the platform seal fits within a seal slot formed by adjacent turbine blades, and the platform seal is assembled within the seal slot with the validation tab affixed to the platform seal and the observable indicator portion being visible.

2. The platform seal assembly of claim 1, wherein the observable indicator portion includes a validation code.

3. The platform seal assembly of claim 2, wherein the validation code is a platform seal validation code, a turbine blade validation code, or an engine validation code.

4. The platform seal assembly of claim 3, wherein the validation code is a part number, an alphanumeric code or a machine readable code.

5. The platform seal assembly of claim 3, wherein the validation tab includes a second validation code.

6. The platform seal assembly of claim 1, wherein the observable indicator portion is color coded to a particular configuration or model of the gas turbine engine.

7. The platform seal assembly of claim 1, wherein the validation tab is configured to be at least partially removed from the platform seal assembly by burning during operation of the gas turbine engine.

8. The platform seal assembly of claim 1, wherein the observable indicator portion is configured to extend from the attachment portion and through a slash face gap between adjacent turbine blades perpendicular to the length of the body.

9. The platform seal assembly of claim 1, wherein the body is a circular cylinder.

10. The platform seal assembly of claim 9, wherein the platform seal further includes:
   a first flat adjacent the first end and parallel to an axis of the body;
   a second flat adjacent the second end and parallel to the first flat; and
   an angled flat adjacent the second end extending at an angle from the second flat in a direction towards the first end.

11. The platform seal assembly of claim 1, wherein the body includes a parallelepiped shape and a curved portion adjacent the second end.

12. A turbine blade assembly for a gas turbine engine turbine disk assembly, the turbine blade assembly comprising:
   a turbine blade including
      an airfoil extending in a first direction, the airfoil including
         a leading edge,
         a trailing edge,
         a pressure side spanning between the leading edge and the trailing edge, and
         a suction side spanning between the leading edge and the trailing edge,
      a blade root extending in a second direction, opposite the first direction, and
      a platform located between the airfoil and the blade root, the platform including
         a forward end adjacent the leading edge,
         an aft end adjacent the trailing edge,
         a pressure side slash face extending from the forward end to the aft end on a pressure side of the platform,
         a pressure side seal slot adjacent the pressure side slash face
         a suction side slash face extending from the forward end to the aft end on a suction side of the platform, and
         a suction side seal slot adjacent the suction side slash face;
   a platform seal affixed to the turbine blade, the platform seal including
      a first end,
      a second end, opposite the first end,
      a body, extending between the first end and the second end, and
      wherein the platform seal is affixed to the turbine blade within the suction side seal slot or within the pressure side seal slot; and
   a validation tab affixed to the platform seal, the validation tab including
      an attachment portion affixed to the platform seal, and
      an observable indicator portion extending from the attachment portion.

13. The turbine blade assembly of claim 12, wherein the observable indicator portion extends from the attachment portion beyond the platform in the first direction.

14. The turbine blade assembly of claim 12, wherein the platform seal is affixed to the turbine blade with an adhesive.

15. A gas turbine engine including the turbine blade assembly of claim 12, wherein the turbine blade assembly is assembled to a turbine disk adjacent a second turbine blade forming a slash face gap between the platform and an adjacent platform of the second turbine blade, and wherein the observable indicator portion extends from the attachment portion through the slash face gap.

16. A method for assembling a turbine disk assembly for a gas turbine engine, the turbine disk assembly including a turbine disk, a plurality of turbine blades, and a plurality of platform seals, the method comprising:
   affixing a validation tab including an attachment portion and an observable indicator portion to a platform seal of the plurality of platform seals;
   affixing the platform seal including the validation tab to a turbine blade of the plurality of turbine blades;
   assembling the plurality of turbine blades to the turbine disk with the observable indicator portion extending through a slash face gap between the turbine blade and an adjacent turbine blade of the plurality of turbine blades in an outward radial position relative to the turbine disk;

inspecting the observable indicator portion to verify proper installation of the platform seal; and removing the validation tab from the platform seal.

17. The method of claim 16, wherein the observable indicator portion includes a validation code and inspecting the observable indicator portion to verify proper installation of the platform seal includes checking for the visual existence of the validation tab, checking the position and orientation of the observable indicator portion with respect to a platform of the turbine blade, and inspecting the validation code.

18. The method of claim 16, wherein removing the validation tab from the platform seal includes burning at least a portion of the validation tab during operation of the gas turbine engine.

* * * * *